(12) United States Patent
Abe et al.

(10) Patent No.: US 8,708,113 B2
(45) Date of Patent: Apr. 29, 2014

(54) BRAKE SYSTEM AND METHOD FOR PRODUCING FRICTION MATERIAL

(75) Inventors: Kenji Abe, Toyota (JP); Hiroshi Isono, Mishima (JP); Yoshitomo Denou, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 13/143,312

(22) PCT Filed: Jun. 15, 2009

(86) PCT No.: PCT/JP2009/060871
§ 371 (c)(1),
(2), (4) Date: Jul. 5, 2011

(87) PCT Pub. No.: WO2010/146650
PCT Pub. Date: Dec. 23, 2010

(65) Prior Publication Data
US 2012/0073914 A1 Mar. 29, 2012

(51) Int. Cl.
*F16D 65/04* (2006.01)
*F16D 65/00* (2006.01)

(52) U.S. Cl.
USPC .............. 188/250 B; 188/250 G; 188/251 A

(58) Field of Classification Search
USPC .......... 188/250 R, 250 G, 250 B, 252, 250 D, 188/218 XL, 251 A, 73.1
See application file for complete search history.

(56) References Cited

U.S. PATENT DOCUMENTS 2,054,872 A * 9/1936 Whisler et al. ............ 192/107 R
4,291,794 A 9/1981 Bauer
4,679,718 A * 7/1987 Kai et al. ..................... 225/48
4,991,697 A * 2/1991 Hummel et al. .......... 188/250 B
5,271,488 A * 12/1993 Cooke et al. .............. 192/107 C
5,288,353 A 2/1994 Revankar (Continued)

FOREIGN PATENT DOCUMENTS

AT 102860 3/1926
CN 102076986 A 5/2011

(Continued)

OTHER PUBLICATIONS

Office Action issued in German Application No. 112009004943.5 dated Feb. 1, 2013 (with translation).

(Continued)

*Primary Examiner* — Melody Burch
(74) *Attorney, Agent, or Firm* — Oliff PLC

(57) ABSTRACT

A brake system includes a pad having a frictional surface, and a disc having a frictional surface sliding on the frictional surface. The frictional surface includes hard particles supported elastically and a plurality of protrusions arranged along a direction in which the frictional surface slides on the frictional surface, and when the frictional surface slides on the frictional surface, hard particles abut respective protrusions continuously while being displaced in the direction perpendicular to the frictional surface. Thus, wear resistance can be improved Since only the vicinities of the peaks of the hard particles and the vicinities of the peaks of the protrusions abut, the hard particles do not follow irregularities of the frictional surface, and thereby the hard particles and the protrusions repeat point contact. Thus, since the distance between the hard particles and the protrusions is stabilized and the adhesion frictional force is stabilized, a stable frictional force can be obtained.

5 Claims, 19 Drawing Sheets

(56) References Cited

U.S. PATENT DOCUMENTS

| | | | |
|---|---|---|---|
| 5,615,758 A | 4/1997 | Nels | |
| 5,842,551 A | 12/1998 | Nels | |
| 5,998,311 A | 12/1999 | Nels | |
| 6,065,579 A | 5/2000 | Nels | |
| 6,105,234 A * | 8/2000 | Kremsmair et al. | 29/521 |
| 6,439,363 B1 | 8/2002 | Nels | |
| 7,090,057 B2 * | 8/2006 | Fryska et al. | 188/71.5 |
| 2005/0039992 A1 | 2/2005 | Hurwic | |
| 2011/0198162 A1 | 8/2011 | Abe et al. | |

FOREIGN PATENT DOCUMENTS

| | | |
|---|---|---|
| DE | 101 30 395 A1 | 2/2002 |
| DE | 695 32 812 T2 | 3/2005 |
| EP | 0 552 666 A1 | 7/1993 |
| JP | A-50-140770 | 11/1975 |
| JP | A-10-506977 | 7/1998 |
| JP | A-2002-257168 | 9/2002 |
| JP | A-2005-140217 | 6/2005 |
| WO | WO 96/10701 A1 | 4/1996 |

OTHER PUBLICATIONS

Jan. 17, 2012 International Preliminary Report on Patentability issued in International Patent Application No. PCT/JP2009/060871.

International Search Report dated Jul. 28, 2009 in International Application No. PCT/JP2009/060871.

* cited by examiner

Fig.3
(A)
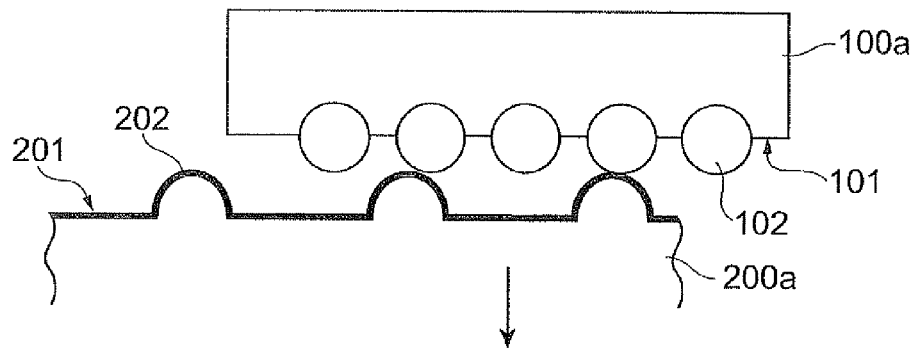
(B)
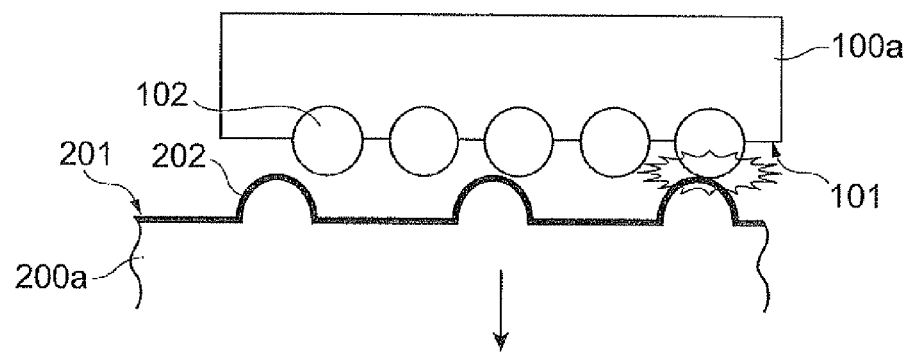
(C)
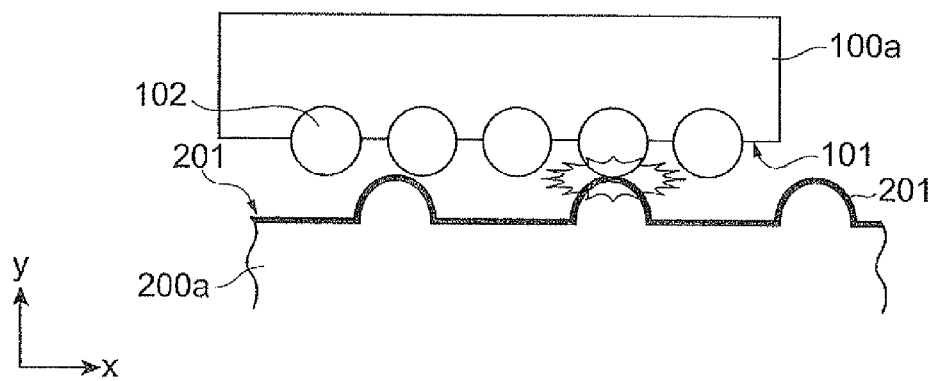

Fig.5
(A)
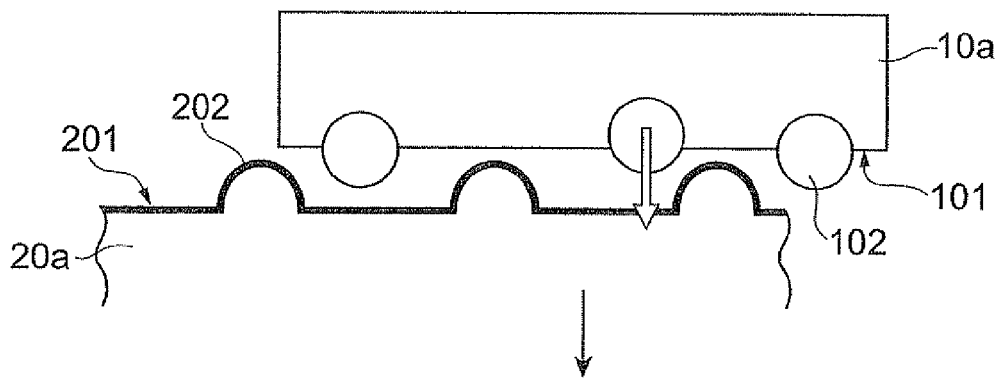
(B)
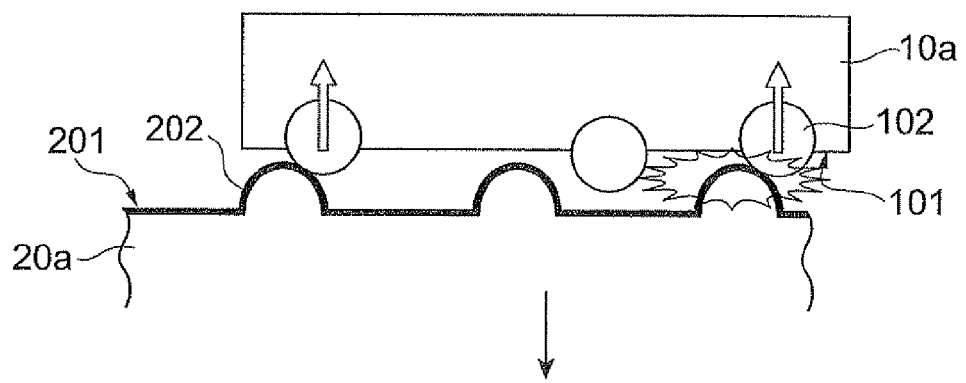
(C)
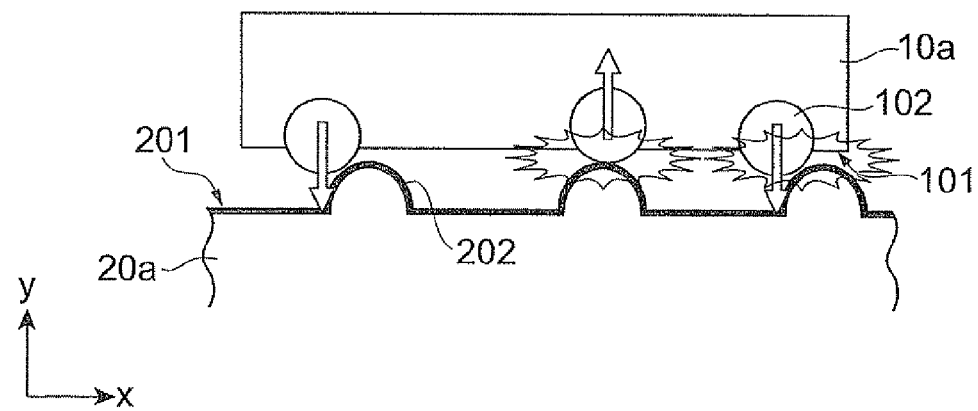

Fig.9
(A)
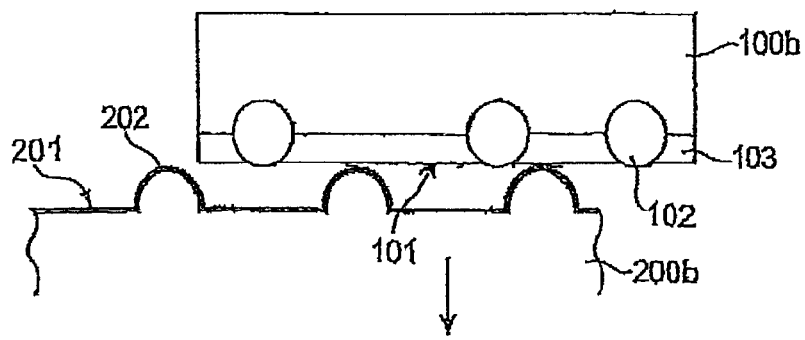
(B)
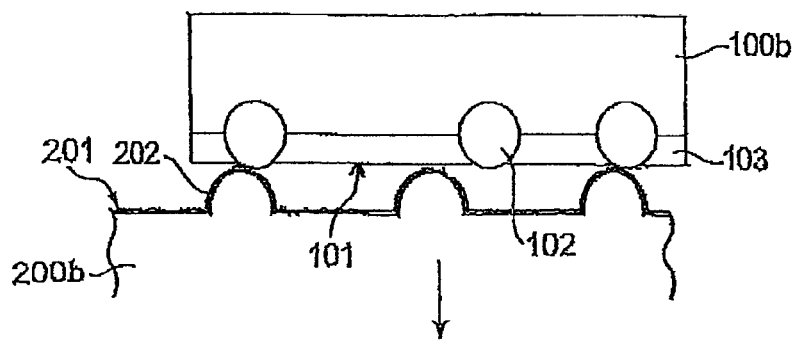
(C)
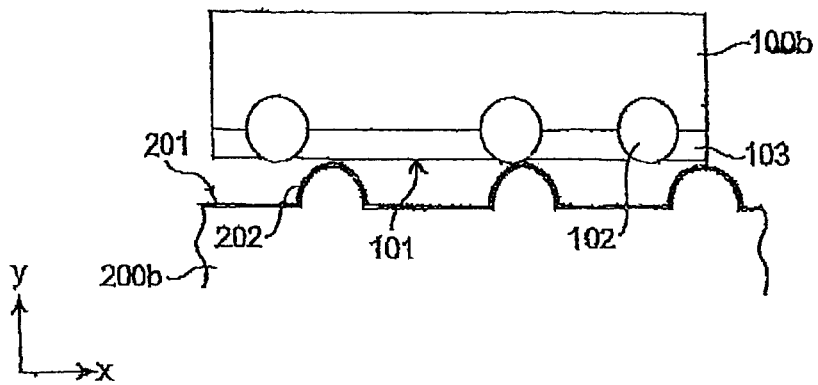

Fig.10
(A)
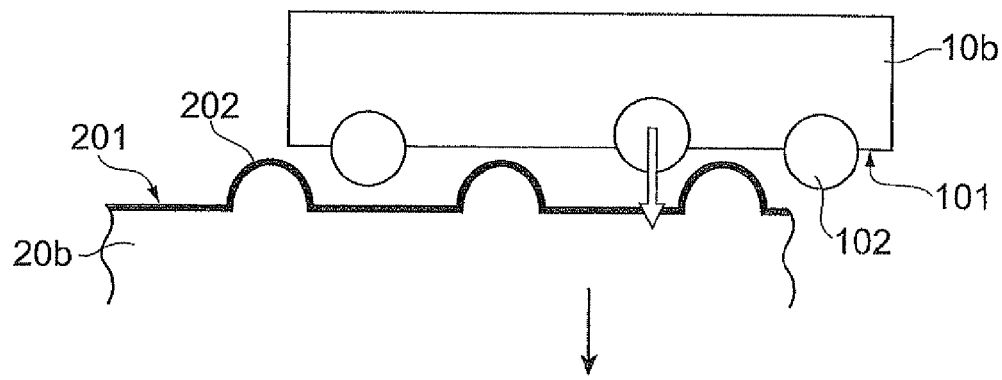
(B)
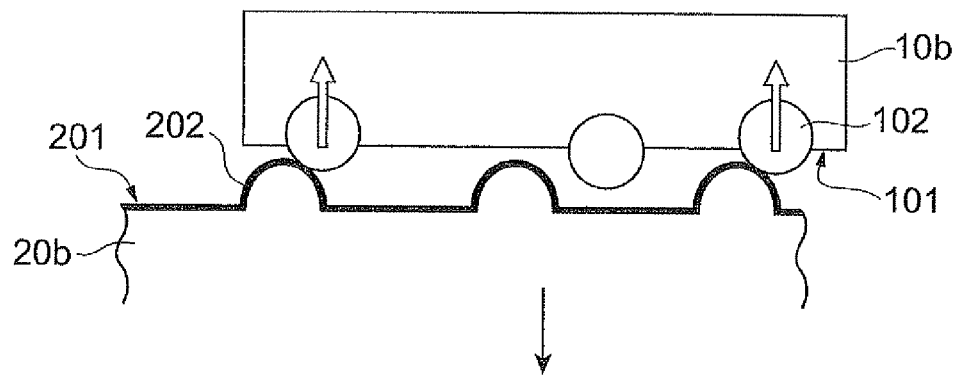
(C)
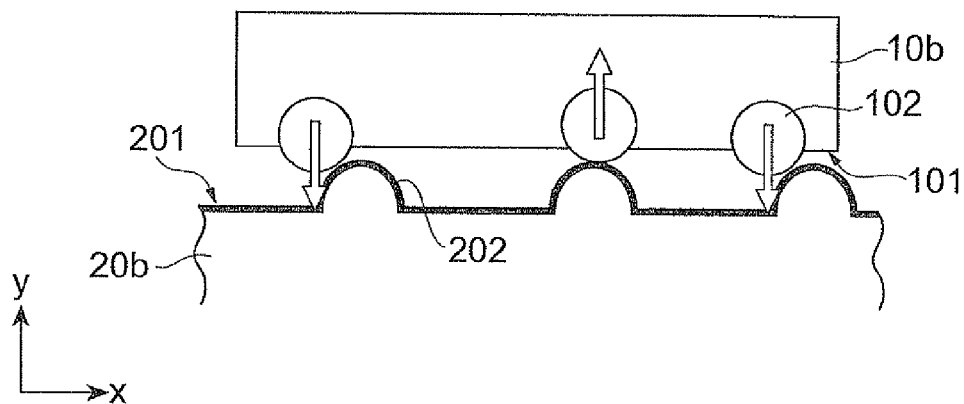

*Fig.11*
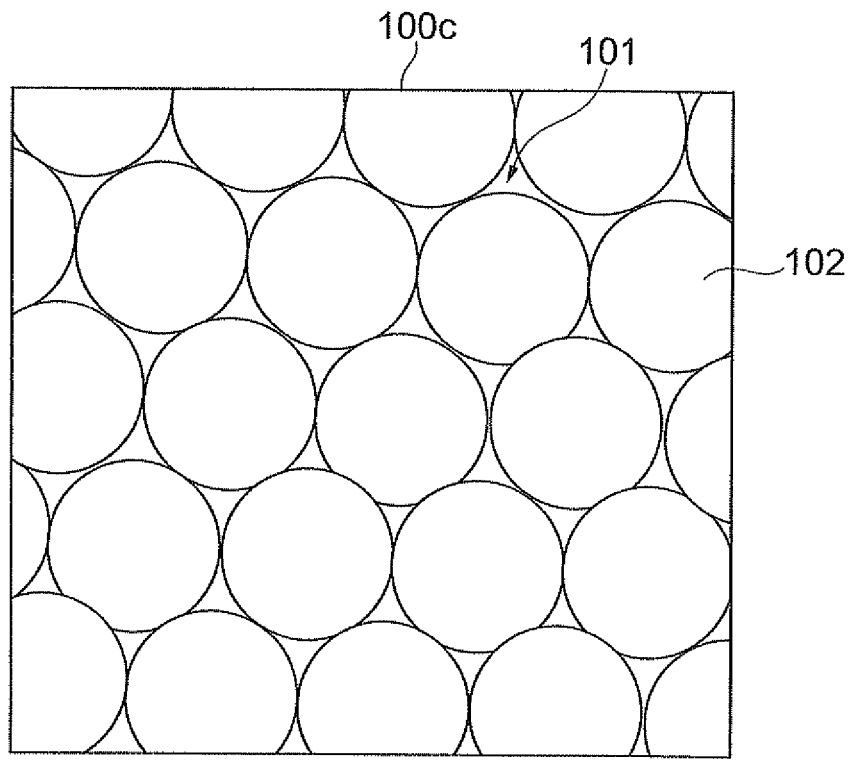
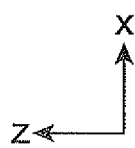

BRAKE SYSTEM AND METHOD FOR PRODUCING FRICTION MATERIAL

TECHNICAL FIELD

The present invention relates to a brake system and a method for producing a friction material, and particularly, to a brake system including a pair of friction materials having a frictional surface, and a method for producing a friction material used for the brake system.

BACKGROUND ART

A brake system consisting of a pad and a rotor (disc) of a conventional brake for an automobile is a combination of a relatively hard component and a relatively soft component. Therefore, the conventional brake system has a problem in that the effect of the brake is poor or either of the hard and soft components is apt to wear out. For example, in a brake system in which a non-steel pad consisting of a soft resin-based component, and a harder cast-iron rotor are combined together, and a frictional force is generated by adhesion friction, there is a problem in that the effect of the brake is poor. Additionally, in a brake system in which a low steel pad consisting of hard steel fibers, and a softer cast-iron rotor are combined together, and a frictional force is generated by abrasive friction, there is a problem in that there is a lot of wear on a rotor.

Thus, for example, Patent Literature 1 discloses a brake pad, which is produced by arranging and forming a composite material portion consisting of at least silicon carbide and metal silicon in a predetermined ratio and having excellent wear resistance, on the surface of a base material of a C/C composite which is a composite carbon fiber, a brake disc, and a brake consisting of the brake pad, in order to improve wear resistance.

CITATION LIST

Patent Literature

Patent Literature 1: Japanese Unexamined Patent Application Publication No. 2002-257168

SUMMARY OF INVENTION

Technical Problem

In the brake system in which hard materials are arranged on both the pad and the disc as described above, there is an advantage that wear is very slight on both the pad and the disc. However, in the brake system in which the hard materials are arranged on both the pad and the disc as described above, the frictional forces (coefficient of friction) of the pad and the disc are not necessarily made high, and the stability of the frictional forces is also low.

The invention has been made in consideration of such circumstances, and the object thereof is to provide a brake system and a method for producing a friction material which can obtain a high frictional force, without sacrificing wear resistance.

Solution to Problem

The invention provides a brake system including a first friction material having a first frictional surface, and a second friction material having a second frictional surface moving with respect to the first frictional surface. The first frictional surface includes first protrusions which are supported elastically in a direction perpendicular to the second frictional surface. The second frictional surface includes a plurality of second protrusions which are arranged along the movement direction of the second frictional surface with respect to the frictional surface. When the first frictional surface moves with respect to the second frictional surface, the first protrusions abut on the respective second protrusions continuously, and only the vicinities of the peaks of the first protrusions and the vicinities of the peaks of the second protrusions abut on each other.

According to this configuration, in a brake system including a first friction material having a first frictional surface, and a second friction material having a second frictional surface moving with respect to the first frictional surface, the first frictional surface includes first protrusions which are supported elastically in a direction perpendicular to the second frictional surface, the second frictional surface includes a plurality of second protrusions which are arranged along the movement direction of the second frictional surface with respect to the first frictional surface, and when the first frictional surface moves with respect to the second frictional surface, the first protrusions abut on the respective second protrusions continuously while being displaced in a direction perpendicular to the second frictional surface. Therefore, wear resistance can be improved as compared to a brake system which has mainly abrasive friction.

Additionally, since only the vicinities of the peaks of the first protrusions and the vicinities of the peaks of the second protrusions abut on each other, the first protrusions do not follow irregularities of the second frictional surface, and the first protrusions and the second protrusions repeat point contact (adhesion friction). As a result, since the distance between the first protrusions and the second protrusions is stabilized and the adhesion frictional force between the first frictional surface and the second frictional surface is stabilized, a stable frictional force can be obtained.

Moreover, since the vibration of the first protrusions is low and the first protrusions are elastically supported so as to have a large damping coefficient, heat-exchange efficiency can be increased and a higher frictional force can be obtained.

In addition, the vicinities of the peaks in the invention may be within a range of 3% of the height of the peaks.

According to this configuration, substantially the same working effects as a case where only the peaks of the first protrusions and the peaks of the second protrusions abut on each other is exhibited. Therefore, the distance between the first protrusions and the second protrusions is stabilized and the adhesion frictional force between the first frictional surface and the second frictional surface is stabilized. Therefore, a stable frictional force can be obtained. Additionally, since the vibration of the first protrusions is low and the first protrusions are elastically supported so as to have a large damping coefficient, heat-exchange efficiency can be increased and a higher frictional force can be obtained.

In this case, preferably, the brake system further includes a soft member which covers the peripheries of either the first protrusions or the second protrusions and is softer than the first protrusions and the second protrusions, and the soft material is exposed only in the vicinities of the peaks of the first protrusions and in the vicinities of the peaks of the second protrusions.

According to this configuration, the brake system further includes a soft member which covers the peripheries of either the first protrusions or the second protrusions and is softer than the first protrusions and the second protrusions. The soft material is exposed only in the vicinities of the peaks of the first protrusions and in the vicinities of the peaks of the second protrusions. Therefore, even in a case where the velocity of movement is slow, the first protrusions do not follow irregularities of the second frictional surface, and a more stable frictional force can be obtained. Additionally, even in a case where the velocity of movement is slow, the first protrusions do not follow irregularities of the second frictional surface. Therefore, vibration or noise of the first protrusions can be prevented.

Additionally, preferably, either each of a plurality of the first protrusions or each of a plurality of the second protrusions is formed in either a spherical shape or a hemispherical shape with the same size, and is arranged close to each other in either a hexagonal grid-like arrangement or a square grid-like arrangement in either the first frictional surface or in the second frictional surface.

According to this configuration, since either each of a plurality of the first protrusions or each of a plurality of the second protrusions is formed in either a spherical shape or a hemispherical shape with the same size, and is arranged close to each other in either a hexagonal grid-like arrangement or a square grid-like arrangement in either the first frictional surface or in the second frictional surface, production is easy. Additionally, the density of the protrusions per unit area becomes large. Thereby, the number of times in which the protrusions come into contact with each other per unit of time can be increased, and a large frictional force can be obtained.

Additionally, preferably, either a plurality of the first protrusions or a plurality of the second protrusions is formed by arranging a net-like member made by knitting wire rods, on either the first frictional surface or the second frictional surface.

According to this configuration, since either a plurality of the first protrusions or a plurality of the second protrusions is formed by arranging a net-like member made by knitting wire rods, on either the first frictional surface or the second frictional surface, production can easily performed, and the production cost can also be made low.

Additionally, preferably, either a plurality of the first protrusions or a plurality of the second protrusions is arranged by laminating a plurality of the net-like members on either the first frictional surface or the second frictional surface.

According to this configuration, since either a plurality of the first protrusions or a plurality of the second protrusions is arranged by laminating a plurality of the net-like members on either the first frictional surface or the second frictional surface, even if the frictional surface has worn out, the net-like member at the next layer is exposed as the protrusions, and consequently, durability can be improved.

Additionally, the invention provides a method for producing a friction material. The method includes arranging a net-like member made by knitting wire rods, on a frictional surface.

According to this configuration, since a frictional surface is formed by arranging a net-like member made by knitting wire rods on the frictional surface, it is possible to produce the friction material easily at low cost.

In this case, preferably, a plurality of the net-like members is laminated and arranged on the frictional surface.

According to this configuration, since a plurality of the net-like members is laminated and arranged on the frictional surface, even if the frictional surface has worn out, the net-like member at the next layer is exposed, and consequently, the frictional surface with improved durability can be produced.

Advantageous Effects of Invention

According to the brake system of the invention, it is possible to obtain a more stable frictional force without sacrificing wear resistance. According to the method for producing a friction material of the invention, it is possible to produce a friction material capable of obtaining a more stable frictional force without sacrificing wear resistance.

BRIEF DESCRIPTION OF THE DRAWINGS

FIGS. 3A to 3C are side views showing the contact state between the pad and the disc related to the first embodiment.

FIGS. 5A to 5C are side views showing the contact state between a pad and a disc related to the conventional technique.

FIGS. 9A to 9C are side views showing the contact state between the pad and the disc related to the second embodiment.

FIGS. 10A to 10C are side views showing the contact state between the pad and the disc related to the conventional technique in a case where the attenuation coefficient is large and the rotating speed of the disc is slow.

FIG. 11 is a plan view showing the frictional surface of a pad related to a third embodiment.

DESCRIPTION OF EMBODIMENTS

Hereinafter, a brake system related to embodiments of the invention will be described with reference to the drawings.

Figure 1:
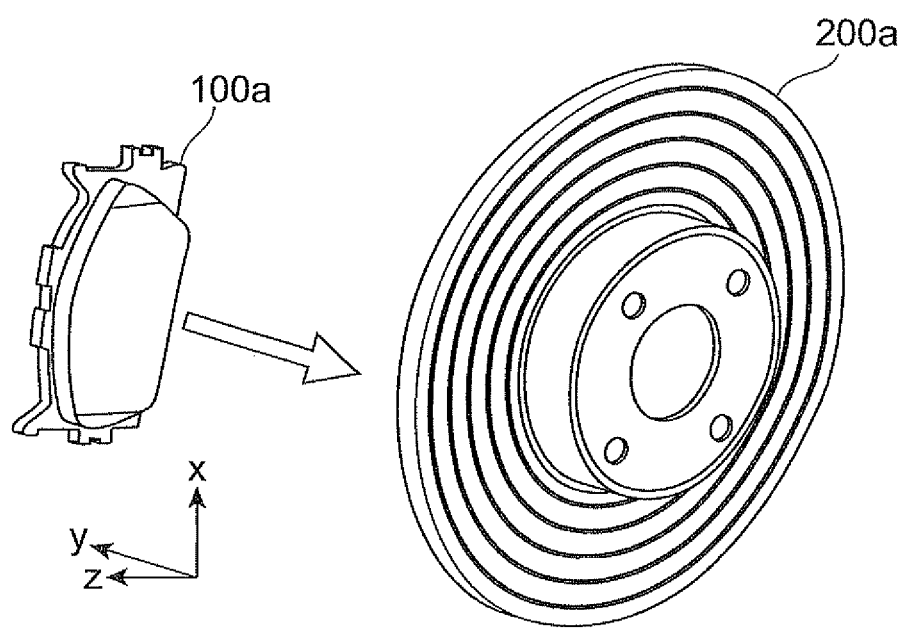
FIG. 1 is a perspective view showing a pad and a disc related to a first embodiment.

In a first embodiment of the invention, the brake system related to the invention is applied to a disc brake of an automobile. As shown in FIG. 1, the disc brake generates a frictional force as a pad 100a is pressed against a disc 200a which rotates.

Figure 2:
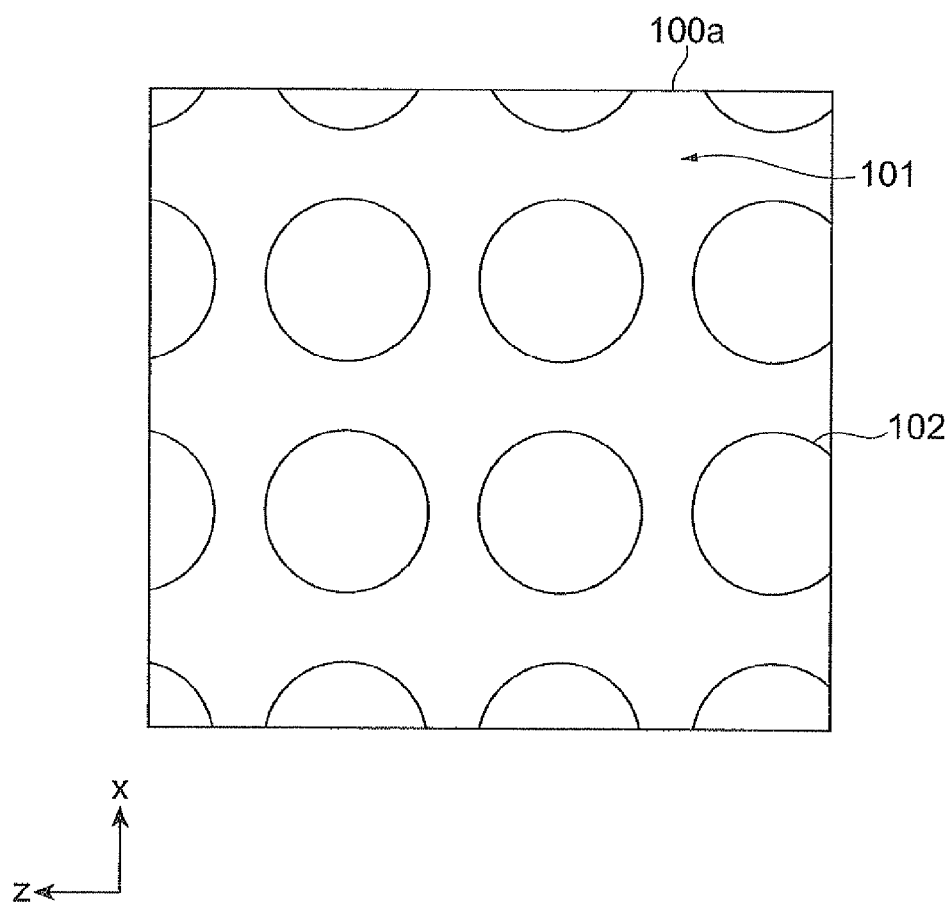
FIG. 2 is a plan view showing the frictional surface of the pad related to the first embodiment.

As shown in FIG. 2 which is a plan view of the pad 100a seen from a y-direction of FIG. 1, a plurality of spherical hard particles 102 is regularly arranged on the frictional surface 101 of the pad 100a. The diameter of the hard particles 102 is 5 to 20 μm, and more preferably 8 to 15 μm. The hard particles 102 are made of ceramics, such as $Si_3N_4$, $Al_2O_3$, and $ZrO_2$.

As shown in FIGS. 3A to 3C, which are side views of the pad 100a and the disc 200a seen from a z-direction of FIG. 1, a plurality of rows of protrusions 202 are arranged along a direction in which the disc 200a slides on the pad 100a, even on a frictional surface 201 of the disc 200a. The hard particles 102 and the protrusions 202 are the same size as each other. When the disc 200a slides on the pad 100a, the hard particles 102 and the protrusions 202 are arranged such that the central portions thereof abut on each other.

The hard particles 102 of the pad 100a and the protrusions 202 of the disc 200a have a hardness such that the hard particles and the protrusions are not worn out during braking, or preferably have a Mohs hardness of 9 or more. Additionally, the hard particles 102 of the pad 100a and the protrusions 202 of the disc 200a are made of the same kind of material, or are preferably made of a material having the same Mohs hardness.

The hard particles 102 are elastically supported by an elastic support body, such as an organic compound (admixture containing resin-based organic ingredients, such as rubber or resin, 50% or more) such that the pad 100a has a predetermined spring constant and attenuation coefficient. Therefore, as shown in FIGS. 3A to 3C, when the disc 200a slides on the pad 100a, the hard particles 102 abut on the respective protrusions 202 continuously. Additionally, at this time, the hard particles and the protrusions abut on each other only within a range of 2 to 3% of the height of the peaks of the hard particles 102 from the frictional surface 101 near the peaks of the hard particles 102 and within a range of 2 to 3% of the height of the peaks of the protrusions 202 near the peaks of the protrusions 202.

Hereinafter, the working effects of the brake system of the present embodiment will be described. Generally, two kinds of influences of adhesion friction and thermal conversion caused by attenuation are significant in the dry friction phenomenon between hard members with little difference in hardness. In addition, the above-described abrasive friction is a principle that one hard friction material shaves off another softer friction material, and has little influence on the dry friction phenomenon between hard members with little difference in hardness.

The principle of thermal conversion caused by attenuation is that, if the hard particles 102 are supported so as to have a predetermined attenuation coefficient since the elastically supported hard particles 102 are supported by the protrusions 202, thereby, the kinetic energy of the disc 200a can be thermally converted to bring about deceleration.

Figure 4:
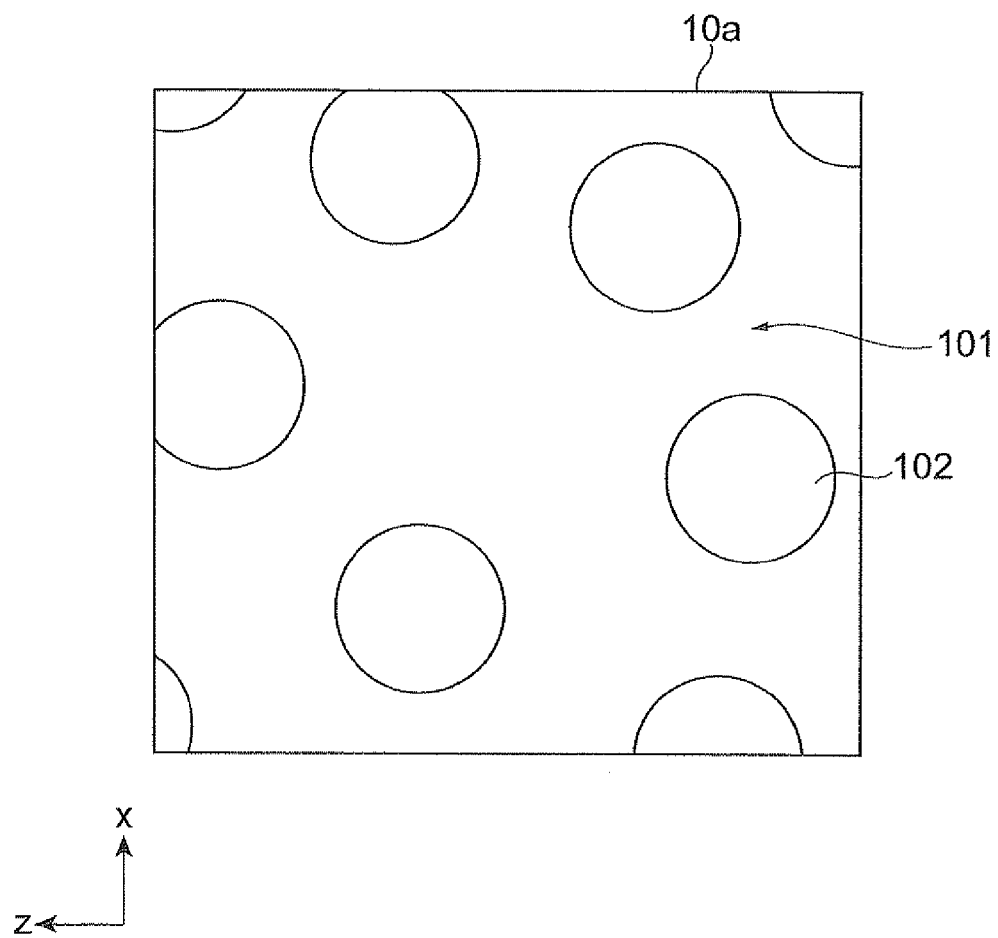
FIG. 4 is a plan view showing a conventional frictional surface.

Here, as for the conventional pad 10a as shown in FIG. 4, the hard particles 102 are elastically supported by the frictional surface 101, without taking into consideration the intervals between the hard particles 102, the spring constant, and the attenuation coefficient. Particularly in a case where the attenuation coefficient is small, as shown in FIGS. 5A to 5C, the hard particles 102 vibrate in the perpendicular direction y of the frictional surface 201 when the disc 20a slides on the pad 10a. The pressing load of the pad 10a against the disc 20a becomes unstable. The distance between the hard particles 102 and the protrusions 202 becomes unstable. Therefore, the adhesion frictional force becomes unstable. Additionally, heat exchange also becomes less efficient.

Thus in the present embodiment, the hard particles 102 are more regularly and more densely arranged according to the frictional surface 101. Additionally, the frictional surface 101 supports the hard particles 102 elastically so as to have an attenuation coefficient beyond a degree at which the hard particles 102 cannot follow the protrusions 202.

Figure 6:
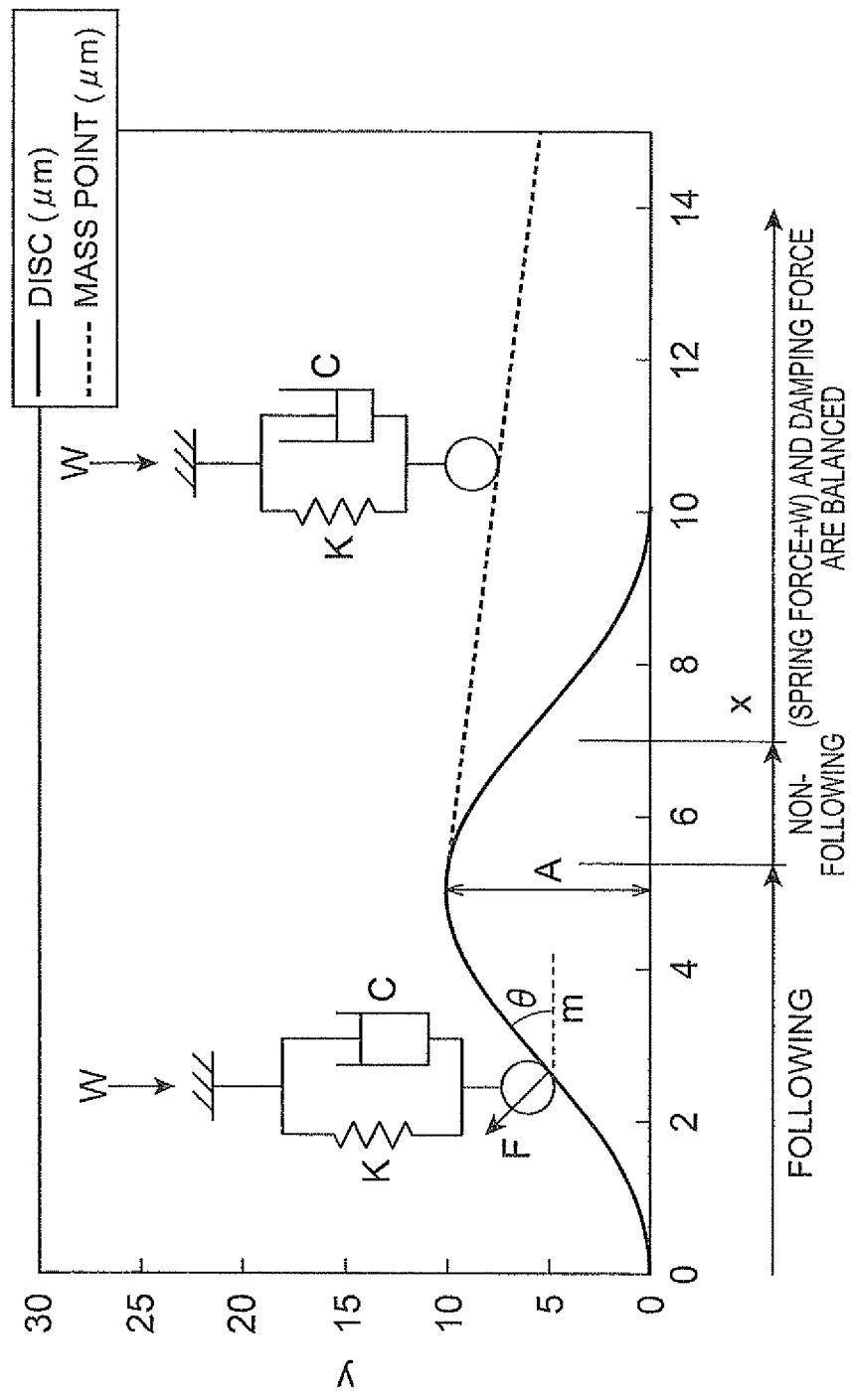
FIG. 6 is a view showing the following capability of hard particles by a model showing the damping coefficient and spring coefficient of the pad.

Hereinafter, the following capability of the hard particles 102 to the protrusions 202 will be discussed. As shown in FIG. 6, it is assumed that the hard particles 102 abut on the sinusoidal protrusions 202 with an amplitude A, and are displaced. It is assumed that the hard particles 102 having mass m are supported so as to be pressed against the protrusions 202 with a pressing force W by an elastic member having a spring constant K and an attenuation coefficient C. The angle at which the surface of a protrusion 202 makes with the horizontal surface is defined as θ.

Supposing the velocity V at which the disc 200a slides on the pad 100a is constant in the respective states of the hard particles 102 as shown in FIG. 6, the following Expression (1) is established.

$$x = Vt \tag{1}$$

(1) Following (1) Supposing displacement of the hard particles 102 in the y direction is determined according to the following Expression (2) when the hard particles 102 follow the protrusions 202, the condition of following becomes the following Expression (3).

$$y = f(x) \tag{2}$$

$$F \geq 0 \tag{3}$$

Accordingly, the following Expressions (4) and (5) described above are established.

$$\tan \theta = dy/dx \tag{4}$$

$$m\ddot{y} = F \cos \theta - Ky - C\dot{y} - W \tag{5}$$

Additionally, the following Expression (6) is established from Expression (5).

$$F = \frac{1}{\cos\theta}(Ky + C\dot{y} + m\ddot{y} + W) \tag{6}$$

(2) Non-Following

The condition of Non-following is the following Expression (7).

$$F < 0 \tag{7}$$

Accordingly, the following Expression (8) is established.

$$\ddot{y} = \frac{1}{m}(-Ky - C\dot{y} - W) \tag{8}$$

(3) (Spring Force+W) and Damping Force are Balanced in Non-Following

The condition in which a (spring force+W) and a damping force are balanced in non-following is the following Expression (9).

$$-Ky - C\dot{y} - W \geq 0 \tag{9}$$

Accordingly, the following Expression (10) is established.

$$\dot{y} = \frac{1}{C}(-Ky - W) \quad (10)$$

(4) Landing Condition (and Subsequently Becomes (1) Following)

The condition in which a hard particle 102 lands on the bottom of a protrusion 202 is the following Expression (11).

$$y \leq A(1 - \cos x) \quad (11)$$

The present inventors implemented numerical calculation in the above models. It is assumed that the mass of a mass point of a hard particle 102 is $4.1 \times 10^{-12}$ kg, and the specific gravity is 7.85 g/cm$^3$ assuming the diameter of the hard particles 102 is 10 μm. The specific gravity of 7.85 g/cm$^3$ is equivalent to the specific gravity of iron. It is assumed that the velocity V at which the frictional surface 201 of the disc 200a slides is 5.56 m/s. The velocity V=5.56 m/s corresponds to a case where the vehicle speed of an automobile is 40 km/h. The load W is assumed to be $4.7 \times 10^{-4}$ N. The load W=$4.7 \times 10^{-4}$ N is 1 MPa, and the density (ratio) is equivalent to 0.1.

Figure 7:
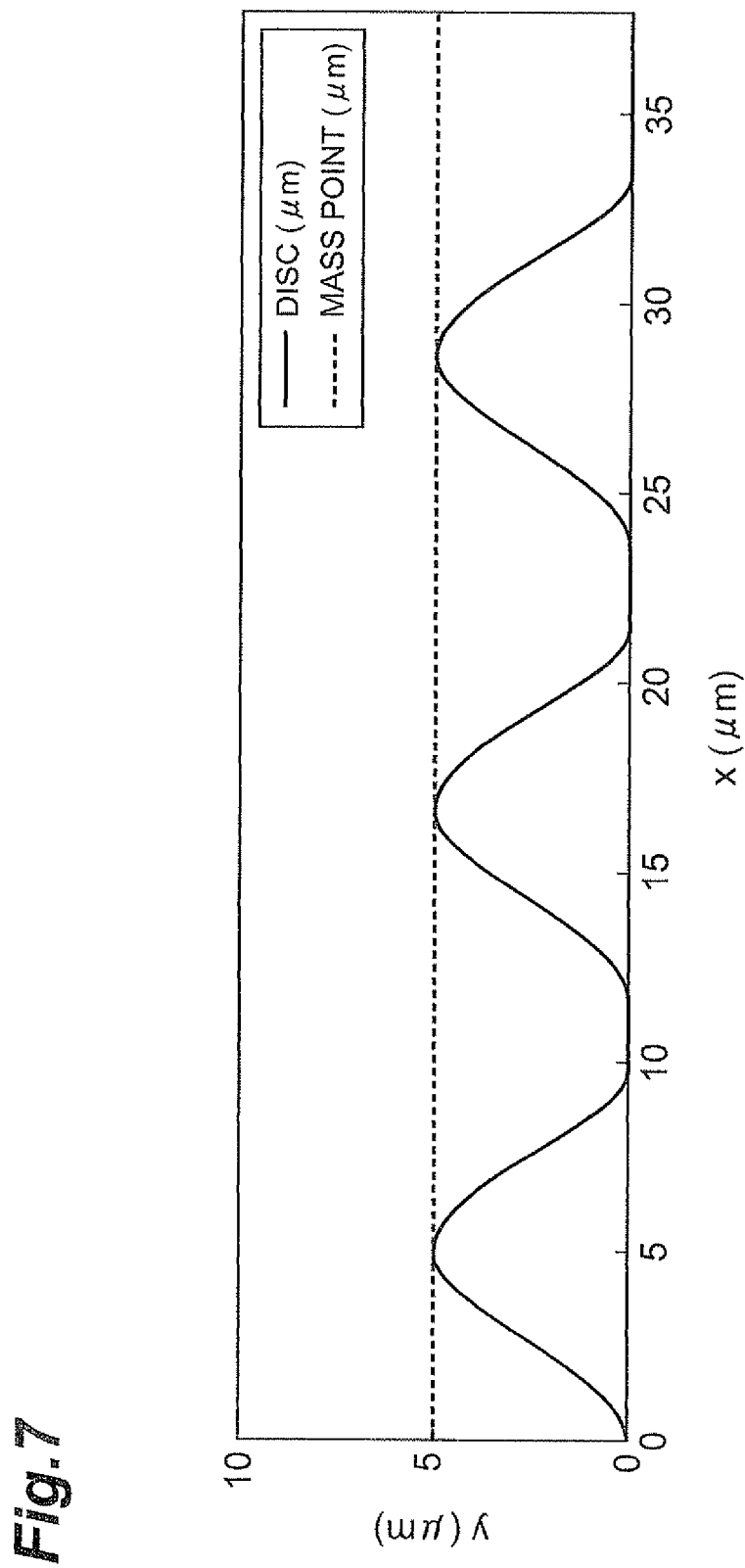
FIG. 7 is a graph showing displacement of mass points of the hard particles with respect to the frictional surface of the disc in a case where the damping coefficient is too large and does not follow irregularities of the frictional surface of the disc.

In the above conditions, the spring constant K is assumed to be 100 N/m. The attenuation coefficient C is assumed to be 0.2 N/(m/s). In addition, assuming a spring whose spring constant K is 1000 N/mm per 1 mm$^2$ is divided by 10×10 μm, the spring constant K becomes 100 N/m. Since the attenuation coefficient C becomes about 0.2 to 0.3% of the spring constant K in a case where the elastic body is rubber, the attenuation coefficient of C=0.2 N/(m/s) is quoted from the characteristics of a rubber bush. In this case, since the attenuation coefficient C is large as shown in FIG. 7, the hard particles 102 no longer follow the protrusions 202.

Figure 8:
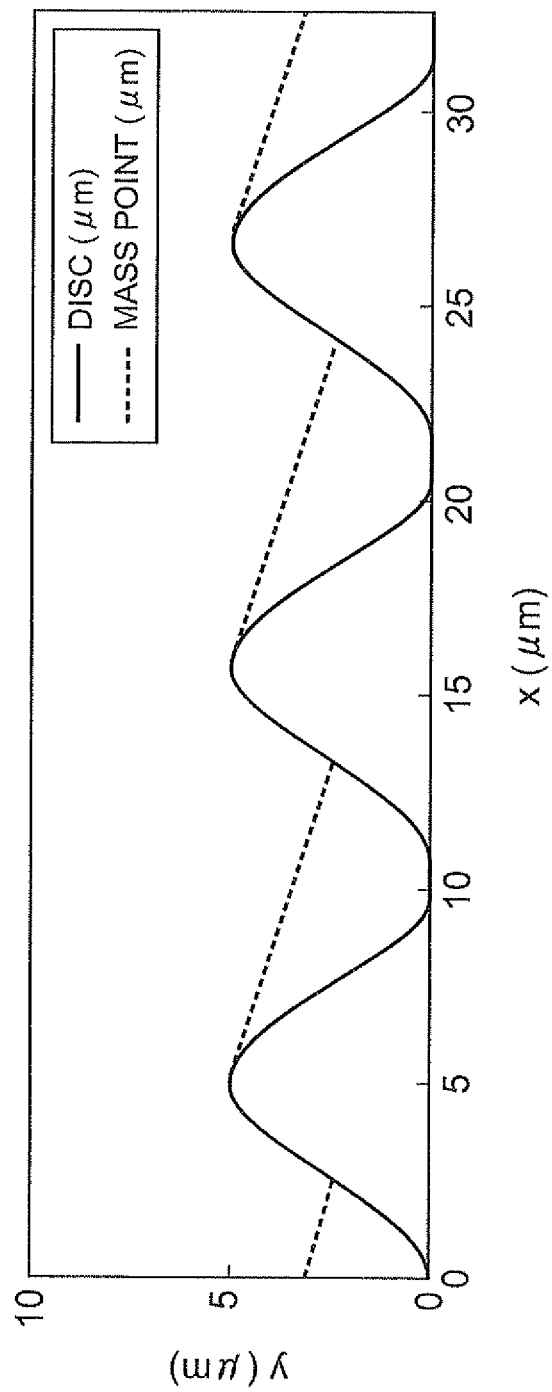
FIG. 8 is a graph showing displacement of mass points of the hard particles with respect to the frictional surface of the disc in a case where the damping coefficient is small or the rotating speed of the disc is slow.

On the other hand, the attenuation coefficient C is assumed to be 0.0005 N/(m/s) which is a smaller value. In this case, as shown in FIG. 8, since the attenuation coefficient C is small, the hard particles 102 do not follow the protrusions 202 completely. However, the locus of a contact point vibrates. In addition, even if the attenuation coefficient C is the same, even in a case where the vehicle speed of an automobile is slow, the rotating speed of the disc 200a is low, and when the velocity V is low, as shown in FIG. 8, the hard particles 102 vibrate.

In the present embodiment, in the brake system including the pad 100a having the frictional surface 101, and the disc 200a having the frictional surface 201 which slides on the frictional surface 101, the frictional surface 101 includes the hard particles 102 elastically supported in the direction perpendicular to the frictional surface 201, and the frictional surface 201 includes the plurality of protrusions 202 arranged along the direction in which the frictional surface 201 slides on the frictional surface 101, and when the frictional surface 201 slides on the frictional surface 101, the hard particles 102 abut on the respective protrusions 202 continuously while being displaced in the direction perpendicular to the frictional surface 201. Therefore, wear resistance can be improved as compared to a brake system which has mainly abrasive friction.

Additionally, since the hard particles and the protrusions abut on each other only within a range of 2 to 3% of the height of the peaks of the hard particles 102 near the peaks of the hard particles 102, and within a range of 2 to 3% of the height of the peaks of the protrusions 202 near the peaks of the protrusions 202, the hard particles 102 do not follow irregularities of the frictional surface 201, and the hard particles 102 and the protrusions 202 repeat point contact (adhesion friction). As a result, since the distance between the hard particles 102 and the protrusions 202 is stabilized and the adhesion frictional force between the frictional surface 101 and the frictional surface 201 is stabilized, a stable frictional force can be obtained.

Moreover, since the vibration of the hard particles 102 is low and the hard particles are elastically supported so as to have a large damping coefficient, heat-exchange efficiency can be increased and a higher frictional force can be obtained.

Hereinafter, a second embodiment of the invention will be described. As shown in shown in FIG. 9A, in a brake system of the present embodiment, the spaces between the hard particles 102 of a pad 100b are filled with a separate member 103 softer than the hard particles 102, for example, resin. The hard particles are exposed from the resin 103 only within a range of 2 to 3% of the height of the peaks of the hard particles 102 from the frictional surface 101 near the peaks of the hard particles 102.

In this case, the spaces between the hard particles 102 may not be filled with a separate member, and the spaces between the protrusions 202 of the disc 200b may be filled with a separate member softer than the protrusions 202, for example, resin. The protrusions can be exposed from a separate member, such as resin, only within a range of 2 to 3% of the height of the peaks of the protrusions 202 from the frictional surface 201 near the peaks of the protrusions 202.

Alternatively, the spaces between the hard particles 102 and the spaces between the protrusions 202 may be filled with a separate member softer than the hard particles 102 and the protrusions 202, for example, resin. In this case, the hard particles and the protrusions can be exposed only within a range of 3% of the height of the peaks of the hard particles 102 from the frictional surface 101 near the peaks of the hard particles 102, and within a range of 2 to 3% of the height of the peaks of the protrusions 202 from the frictional surface 201 near the peaks of the protrusions 202.

Hereinafter, the working effects of the brake system of the present embodiment will be described. The brake system in which the hard particles 102 are elastically supported by the frictional surface 101 of the pad 10b and the frictional surface 201 of the disc 20b is provided with the protrusions 202 is shown in FIG. 10A. Even if the hard particles 102 are supported so as to have a large attenuation coefficient, as shown in FIGS. 10A and 10C, in a case where the vehicle speed of an automobile is slow, the rotating speed of the disc 20b is low, and the sliding velocity of the frictional surface 201 on the frictional surface 101 is slow, there is a concern that the hard particles 102 may follow the shape of the protrusions 202 and be displaced.

The above phenomenon is limited to a case where the automobile is traveling at an extremely low speed. Therefore, there is almost no influence on the effect of the brake that a driver feels. However, there is a concern that the vibration when the hard particles 102 ride over the protrusions 202 may give displeasure to occupants of an automobile as noise or vibration.

On the other hand, in the present embodiment, the spaces between the hard particles 102 of the pad 100b are filled with the resin 103 softer than the hard particles 102. Therefore, the brake system of the present embodiment exhibits the same stable braking force as the above first embodiment while an automobile is traveling at a vehicle speed faster than an extremely low speed. Additionally, in the brake system of the present embodiment, when an automobile is traveling at an extremely low speed, the protrusions 202 follow the resin 103. Thereby, the vibration when the hard particles 102 ride over the protrusions 202 is not generated, and it is possible to prevent displeasure to occupants of the automobile as noise or vibration.

Figure 12:
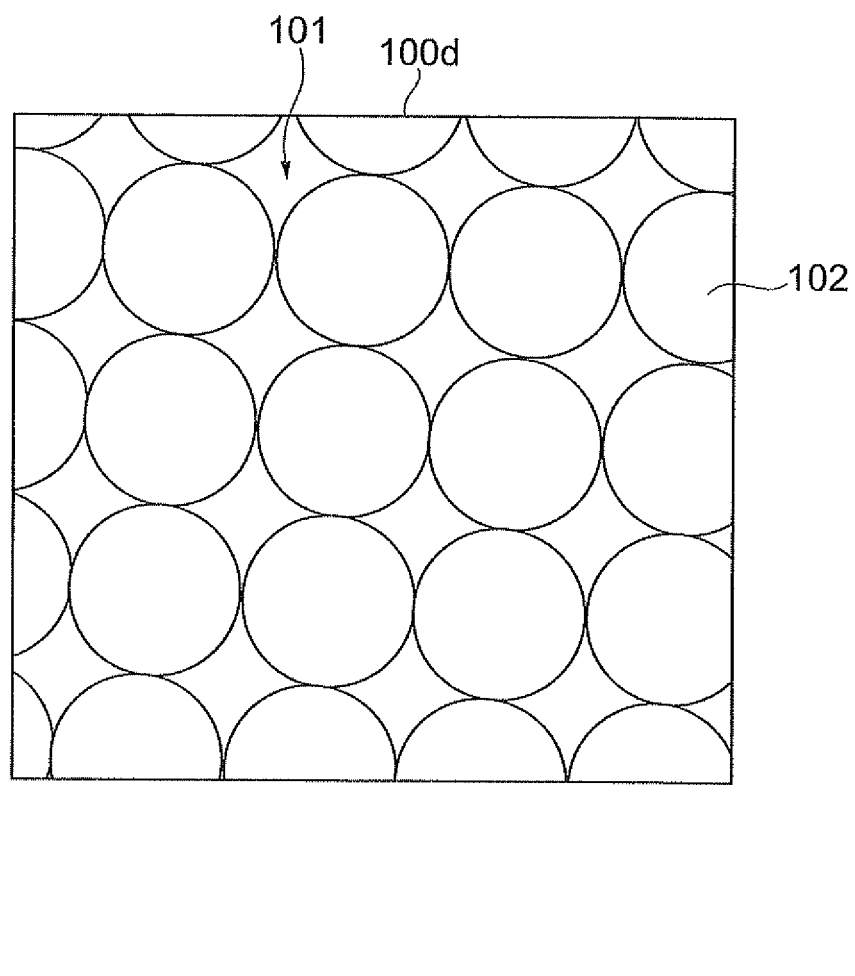
FIG. 12 is a plan view showing the frictional surface of a pad related to a fourth embodiment.

Hereinafter, a third and fourth embodiment of the invention will be described. In a pad 100c of the third embodiment shown in FIG. 11, the spherical or hemispherical hard particles 102 of the same size are arranged close to each other in a hexagonal grid-like arrangement on the frictional surface 101. Additionally, in a pad 100d of the fourth embodiment shown in FIG. 12, the spherical or hemispherical hard particles 102 of the same size are arranged close to each other in a square grid-like arrangement on the frictional surface 100. In addition, the hard particles 102 may be arranged on the frictional surface 201 side of the disc, similarly to the pads 100c and 100d.

In the brake systems of the above third and fourth embodiments, the hard particles 102 are formed in a spherical or semispherical shape with the same size, and are arranged close to each other in a hexagonal grid-like or square grid-like arrangement in the frictional surface 101. Therefore, the pads 100c and 100d are easily produced. Additionally, in the pads 100c and 100d, the density of the hard particles 102 per unit area becomes large. Thereby, the number of times by which the hard particles 102 and the protrusions 202 come into contact with each other per unit of time can be increased, and a large frictional force can be obtained.

Figure 13:
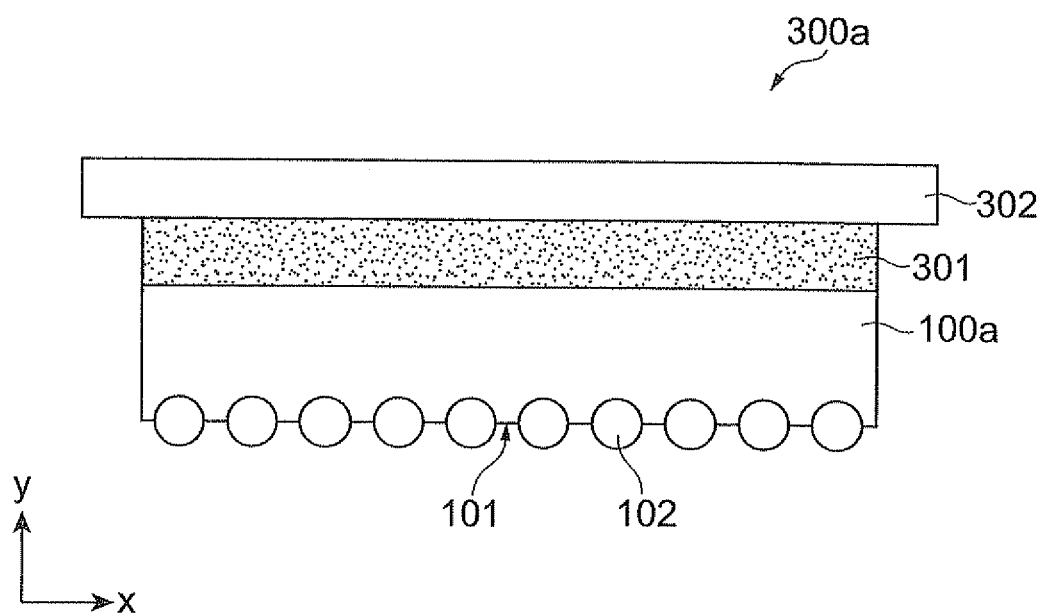
FIG. 13 is a side view showing an example of the supporting structure of a pad related to a fifth embodiment.

Hereinafter, fifth to seventh embodiments of the invention will be described. The brake system of the invention is not limited to a form in which the hard particles 102 have a predetermined spring constant and attenuation coefficient, using an elastic support portion of the pad 100a. For example, a pad supporting structure 300a related to a fifth embodiment shown in FIG. 13 has a shock absorbing material 301 which has a desired spring constant and attenuation coefficient between a back metal 302 of the pad 100a, and the resin which supports the hard particles 102 of the pad 100a. Thereby, even in a material unsuitable for holding the hard particles 102 so as not to be dropped out, there is a possibility that the material can be used as the shock absorbing material 301, and the degree of freedom in design is increased.

Figure 14:
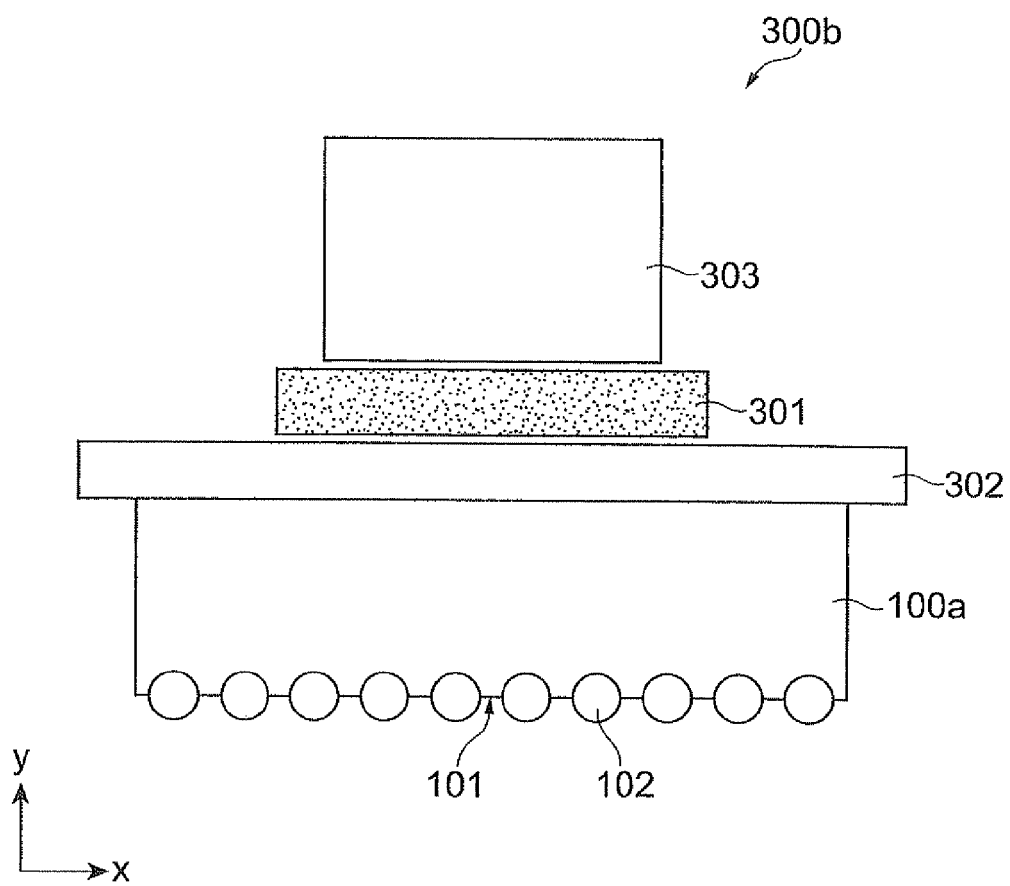
FIG. 14 is a side view showing an example of the supporting structure of a pad related to a sixth embodiment.
Figure 15:
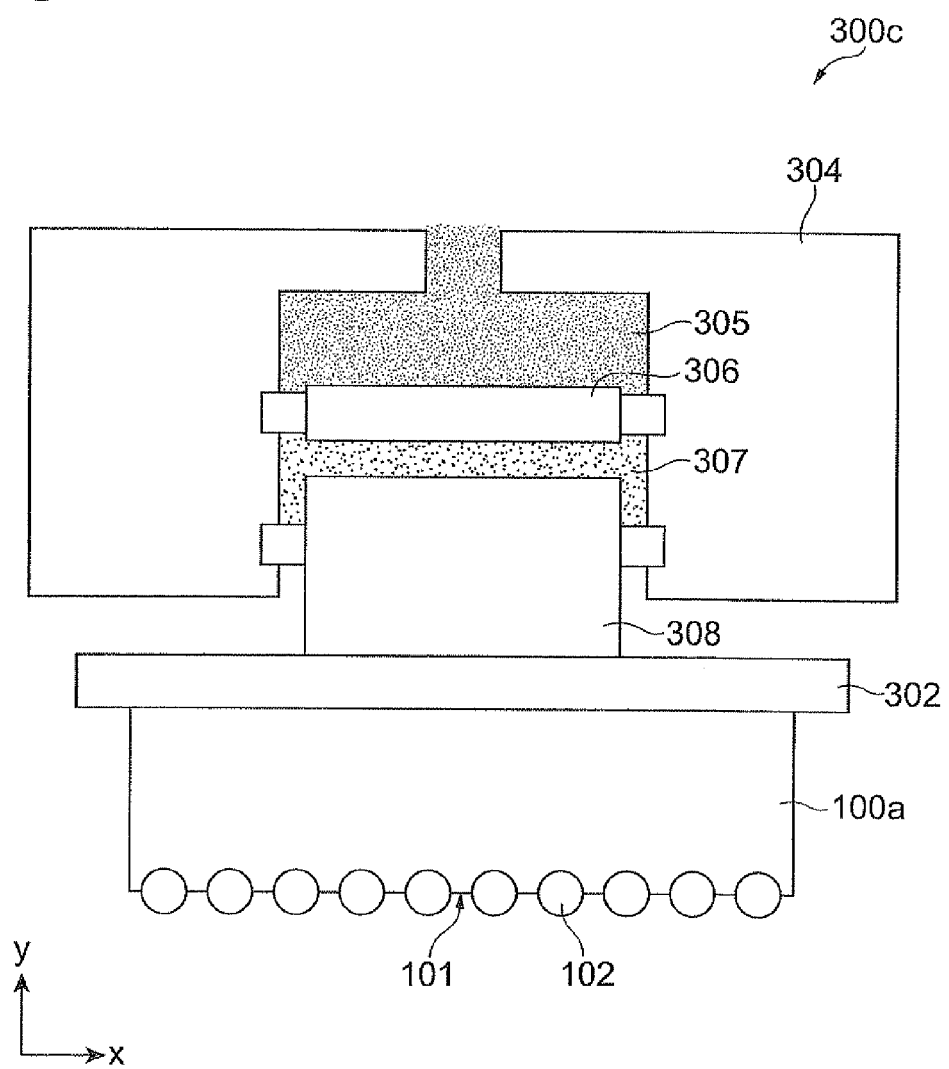
FIG. 15 is a side view showing an example of the supporting structure of a pad related to a seventh embodiment.

Additionally, a pad supporting structure 300b related to the sixth embodiment shown in FIG. 14 has a shock absorbing material 301 between a piston 303, and the pad 100a having a back metal 302. Additionally, in a pad supporting structure 300c related to the seventh embodiment shown in FIG. 15, the pad 100a having the back metal 302 is elastically supported by a cylinder 304, using a first piston 306 pressurized by a brake fluid 305 and a second piston 308 pressurized by oil 307 so as to have a desired spring constant and attenuation coefficient. In the pad supporting structures 300b and 300c of the above sixth and seventh embodiments, it becomes easy to elastically support the pad 100a so as to have a desired spring constant and attenuation coefficient, and the degree of freedom in design is increased.

Figure 16:
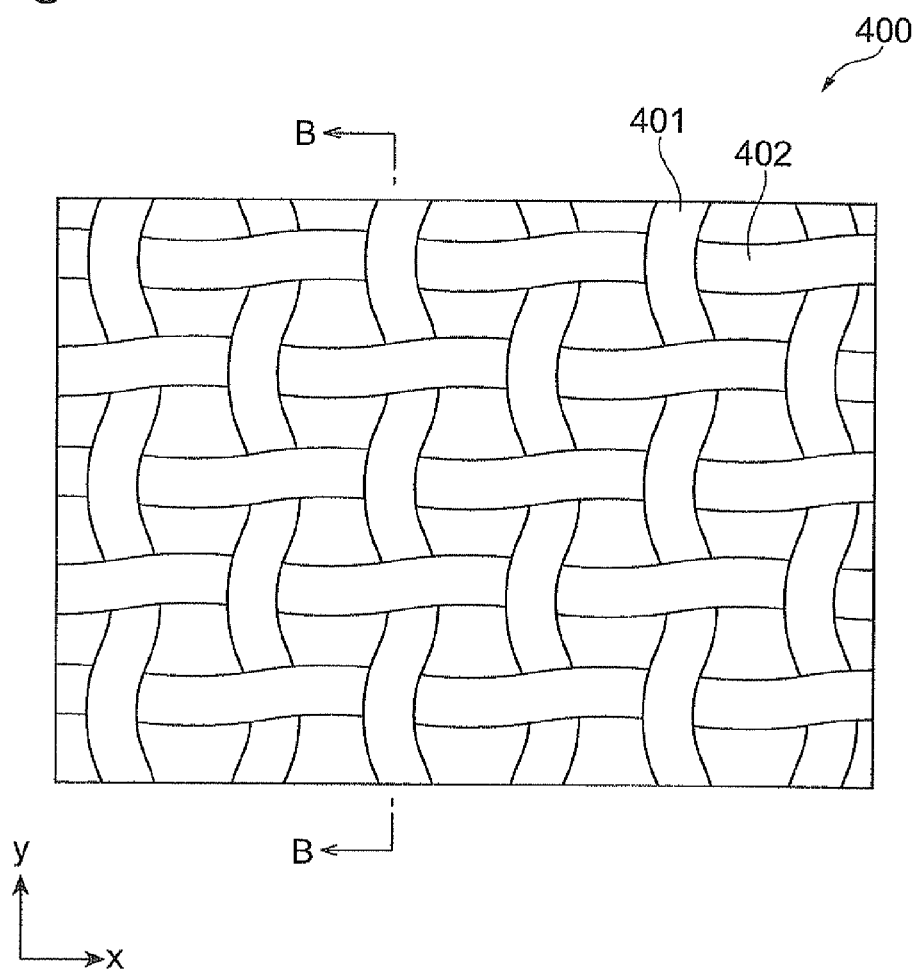
FIG. 16 is an enlarged view of a net used in an eighth embodiment.

Hereinafter, an eighth embodiment of the invention will be described. In the present embodiment, irregularities of the pad or the disc are formed by arranging a net-like member made by knitting wire rods, on the frictional surface 101 or 201. First, in order to produce the pad or disc of the present embodiment, as shown in FIG. 16, vertical fibers 401 and horizontal fibers 402 consisting of aluminum fibers (wires) are knit to produce a net-like member 400 such that protrusions appear in a desired pattern. Next, the net-like member 400 is oxidized and the surface thereof is made into $Al_2O_3$. Thereby, the hardness of the net-like member 400 increases. In addition, the net-like member 400 may be produced from carbon fibers instead of the aluminum fibers.

Figure 17:
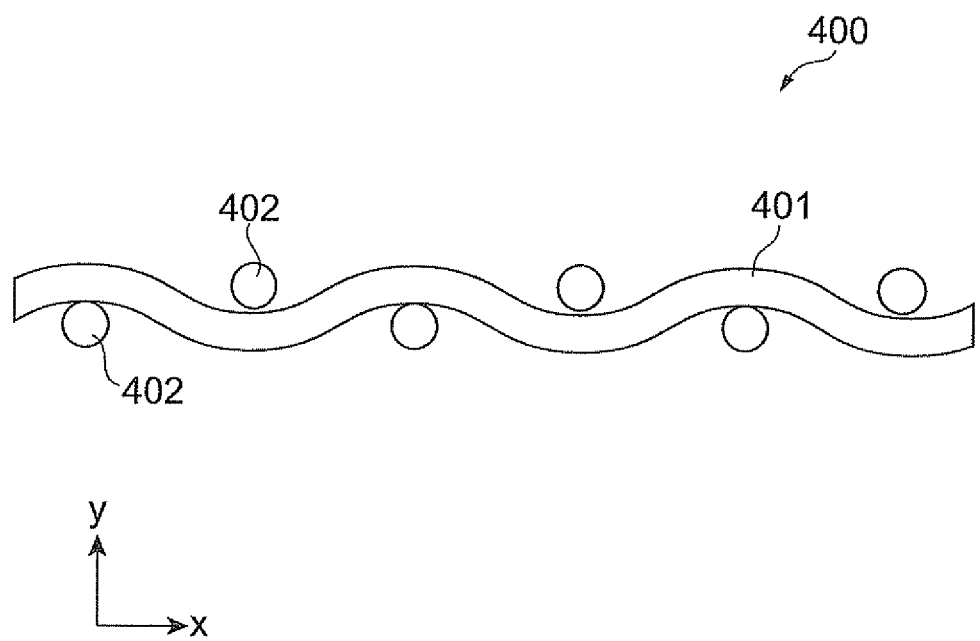
FIG. 17 is a sectional view taken along a line B-B of FIG. 16.
Figure 18:
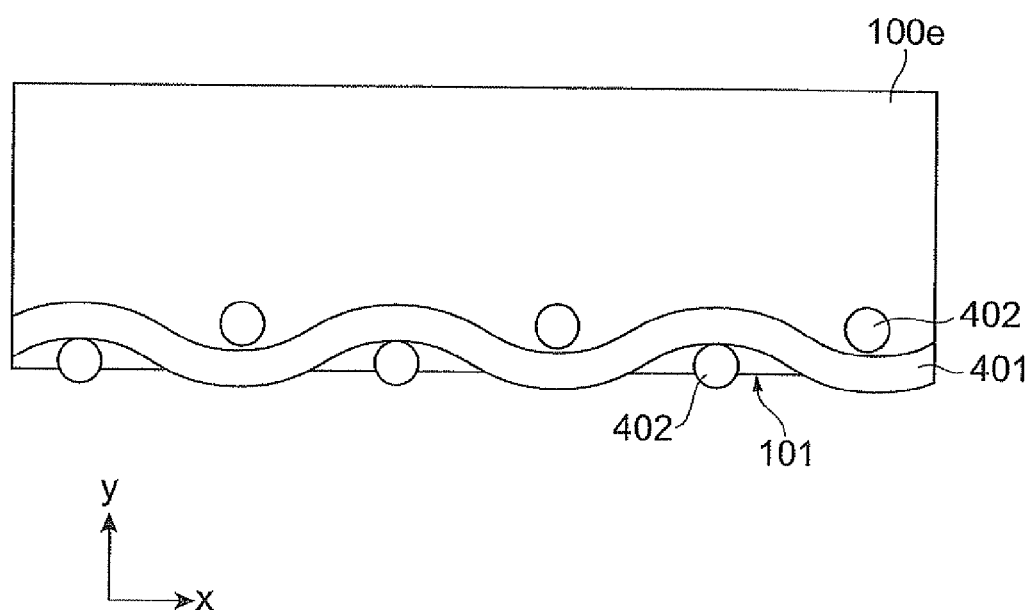
FIG. 18 is a sectional view of a pad related to the eighth embodiment.

As shown in FIG. 17 which is a sectional view taken along the line B-B of FIG. 16, portions which protrude in meshes of the net-like member 400 become protrusions. As shown in FIG. 18, a pad 100e or a brake shoe of the present embodiment can be produced by curing the net-like member 400 with resin or the like. Additionally, durability can be increased by curing the net-like member 400 with ceramics. Alternatively, a disc or a drum can be produced by curing the net-like member after being stuck on a cast-iron die.

According to the present embodiment, since the protrusions of the pad or the disc are formed by arranging the net-like member 400 made by knitting the vertical fibers 401 and the horizontal fibers 402, on the frictional surface 101 or 201, production can easily performed, and the production cost can also be made low.

Figure 19:
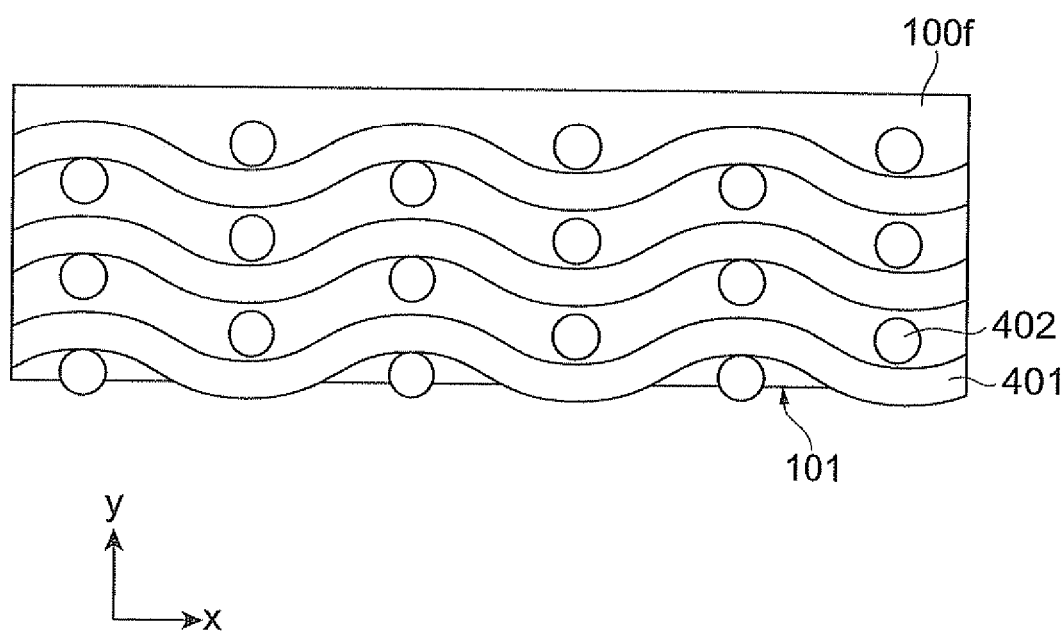
FIG. 19 is a sectional view of a pad related to a ninth embodiment.

Additionally, as shown in a pad 100f of a ninth embodiment shown in FIG. 19, a plurality of net-like members 400 may be arranged so as to be laminated on the frictional surface 101. Thereby, even if the frictional surface 101 has worn out, the net-like member 400 at the next layer is exposed as the protrusions, and consequently, durability can be improved.

Although the embodiments of the invention have been described above, the invention is not limited to the above embodiments, and various modifications thereof can be made. For example, although an example in which the brake system of the invention is applied to the disc brake has been mainly described in the above embodiments, the invention can also be applied to a drum brake.

INDUSTRIAL APPLICABILITY

The invention can provide a brake system and a method for producing a friction material which can obtain a more highly stabilized frictional force, without sacrificing wear resistance.

| Reference Signs List | |
|---|---|
| 10a to 10b: | PAD |
| 20a to 20b: | DISC |
| 100a to 100f: | PAD |
| 101: | FRICTIONAL SURFACE |
| 102: | HARD PARTICLE |
| 103: | RESIN |
| 200a, 200b: | DISC |
| 201: | FRICTIONAL SURFACE |
| 202: | PROTRUSIONS |
| 300a to 300c: | PAD SUPPORTING STRUCTURE |
| 301: | SHOCK ABSORBING MATERIAL |
| 302: | BACK METAL |
| 303: | PISTON |
| 304: | CYLINDER |
| 305: | BRAKE FLUID |
| 306: | FIRST PISTON |
| 307: | OIL |
| 308: | SECOND PISTON |
| 400: | NET-LIKE MEMBER |
| 401: | VERTICAL FIBER |
| 402: | HORIZONTAL FIBER |

The invention claimed is:
1. A brake system comprising:
a first friction material having a first frictional surface, the first frictional surface including first protrusions;
a second friction material having a second frictional surface moving with respect to the first frictional surface, the second frictional surface including a plurality of second protrusions which is arranged along a movement direction of the second frictional surface with respect to the first frictional surface; and a soft member that is softer than the first protrusions and the second protrusions and that covers peripheries of either the first protrusions or the second protrusions such that the first protrusions or the second protrusions are exposed only in the vicinities of the peaks of the first protrusions or in the vicinities of the peaks of the second protrusions, wherein the first protrusions are supported elastically in a direction perpendicular to the second frictional surface, and when the first frictional surface moves with respect to the second frictional surface, the first protrusions abut on the respective second protrusions continuously, and only the vicinities of the peaks of the first protrusions and the vicinities of the peaks of the second protrusions abut on each other.

2. The brake system according to claim 1, wherein the vicinities of the peaks are within a range of 3% of the height of the peaks.

3. The brake system according to claim 1, wherein either each of the plurality of the first protrusions or each of the plurality of the second protrusions is formed in either a spherical shape or a hemispherical shape with the same size, and is arranged close to others of the plurality of the first protrusions or second protrusions in either a hexagonal grid arrangement or a square grid arrangement in either the first frictional surface or in the second frictional surface.

4. The brake system according to claim 1, wherein either the plurality of the first protrusions or the plurality of the second protrusions is formed by arranging a member made by knitting wire rods on either the first frictional surface or the second frictional surface.

5. The brake system according claim 4, wherein either the plurality of the first protrusions or the plurality of the second protrusions is arranged by laminating a plurality of the members made by knitting wire rods on either the first frictional surface or the second frictional surface.

* * * * *